(12) United States Patent
Ishida et al.

(10) Patent No.: US 10,294,356 B2
(45) Date of Patent: *May 21, 2019

(54) BIAXIALLY STRETCHED POLYPROPYLENE FILM FOR CAPACITORS

(71) Applicant: OJI HOLDINGS CORPORATION, Chuo-ku, Tokyo (JP)

(72) Inventors: Tatsuji Ishida, Konan (JP); Masahiro Nakata, Konan (JP); Tadakazu Ishiwata, Chiba (JP); Akihiro Kakehi, Kusatsu (JP); Yoshinori Matsuo, Saitama (JP); Masahiro Yoda, Konan (JP)

(73) Assignee: OJI HOLDINGS CORPORATION, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,934

(22) Filed: Aug. 31, 2018

(65) Prior Publication Data

US 2018/0371223 A1    Dec. 27, 2018

Related U.S. Application Data

(63) Continuation of application No. 15/129,513, filed as application No. PCT/JP2015/053681 on Feb. 10, 2015, now Pat. No. 10,093,792.

(30) Foreign Application Priority Data

Mar. 31, 2014  (JP) ................................ 2014-073192
Jun. 27, 2014  (JP) ................................ 2014-132997

(51) Int. Cl.
| | | |
|---|---|---|
| H01G 4/18 | (2006.01) | |
| C08L 23/12 | (2006.01) | |
| C08J 5/18 | (2006.01) | |
| H01G 4/32 | (2006.01) | |
| H01G 4/33 | (2006.01) | |
| B32B 27/32 | (2006.01) | |
| B32B 7/04 | (2019.01) | |
| B32B 27/08 | (2006.01) | |
| B32B 27/18 | (2006.01) | |
| B32B 27/30 | (2006.01) | |

(52) U.S. Cl.
CPC ............... *C08L 23/12* (2013.01); *B32B 7/04* (2013.01); *B32B 27/08* (2013.01); *B32B 27/18* (2013.01); *B32B 27/302* (2013.01); *B32B 27/32* (2013.01); *C08J 5/18* (2013.01); *H01G 4/18* (2013.01); *H01G 4/32* (2013.01); *H01G 4/33* (2013.01); *B32B 2250/02* (2013.01); *B32B 2255/10* (2013.01); *B32B 2255/205* (2013.01); *B32B 2270/00* (2013.01); *B32B 2307/204* (2013.01); *B32B 2307/518* (2013.01); *B32B 2307/704* (2013.01); *B32B 2457/16* (2013.01); *C08J 2323/12* (2013.01); *C08L 2203/16* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 2007/0110974 A1* | 5/2007 | Ishiwata | ................... C08J 5/18 428/220 |
| 2008/0102247 A1 | 5/2008 | Matsuo | |
| 2010/0081760 A1 | 4/2010 | Rhee et al. | |
| 2013/0288000 A1 | 10/2013 | Ishiwata | |
| 2015/0140266 A1 | 5/2015 | Ishiwata et al. | |
| 2015/0274908 A1 | 10/2015 | Yanagishita | |
| 2017/0121515 A1* | 5/2017 | Ishida | ........................ C08J 5/18 |

FOREIGN PATENT DOCUMENTS

| | | |
|---|---|---|
| EP | 2 341 086 A1 | 7/2011 |
| JP | 59-211908 A | 11/1984 |
| JP | 2004-175932 A | 6/2004 |

(Continued)

OTHER PUBLICATIONS

Communication dated Aug. 17, 2017 from the European Patent Office in counterpart Application No. 15773270.2.
Communication dated Sep. 18, 2017 from the European Patent Office in counterpart Application No. 15773270.2.
International Preliminary Report on Patentability issued from the International Bureau in counterpart International Application No. PCT/JP2015/053681, dated Oct. 13, 2016.
International Search Report of PCT/JP2015/053681, dated May 19, 2015. [PCT/ISA/210].
Written Opinion issued by International Searching Authority in corresponding International Application No. PCT/JP2015/053681 dated May 19, 2015.

(Continued)

*Primary Examiner* — Dion Ferguson
(74) *Attorney, Agent, or Firm* — Sughrue Mion, PLLC

(57) ABSTRACT

The present invention addresses the problem of providing a biaxially stretched polypropylene film for capacitors, which has high voltage resistance and excellent breakdown properties. The present invention also addresses the problem of providing a biaxially stretched polypropylene film for capacitors, which can be used suitably in a high-capacity capacitor to which a high voltage is to be applied under a higher temperature, and which preferably has a small thickness. The present invention relates to a biaxially stretched polypropylene film for capacitors, wherein a polypropylene resin which constitutes the polypropylene film has a number average molecular weight of 40,000 to 100,000 inclusive and a Z average molecular weight of 950,000 to 1,500,000 includes wherein, in a molecular weight distribution curve, the value of the difference obtained by subtracting a differential distribution value at a logarithmic molecular weight Log (M) of 6.0 from a differential distribution value at a logarithmic molecular weight Log (M) of 4.5 is −15 to 11% inclusive.

7 Claims, No Drawings

(56) References Cited

FOREIGN PATENT DOCUMENTS

| | | |
|---|---|---|
| JP | 2006-143975 A | 6/2006 |
| JP | 2010-254794 A | 11/2010 |
| JP | 2014-231584 A | 12/2014 |
| WO | 2013/105552 A1 | 7/2013 |
| WO | 2014/002934 A1 | 1/2014 |

\* cited by examiner

BIAXIALLY STRETCHED POLYPROPYLENE FILM FOR CAPACITORS

CROSS REFERENCE TO RELATED APPLICATIONS

This application is a continuation of Ser. No. 15/129,513 filed Sep. 27, 2016, which is a National Phase application of PCT/JP2015/053681 filed Feb. 10, 2015, and claims benefit to Japanese Application 2014-073192, filed Mar. 31, 2014, and Japanese Application 2014-132997, filed Jun. 27, 2014, the contents of each of which are incorporated herein by reference in their entirety.

TECHNICAL FIELD

The present patent application claims priority under the Paris Convention to Japanese Patent Application No. 2014-73192 (filed on Mar. 31, 2014) and Japanese Patent Application No. 2014-132997 (filed on Jun. 27, 2014), the entirety of which is incorporated herein by reference.

The present invention relates to a biaxially stretched polypropylene film for capacitors, which has high voltage resistance at high temperatures and excellent dielectric breakdown properties. In particular, the present invention relates to a biaxially stretched polypropylene film for capacitors, which can be suitably used in a high-capacity capacitor to which a high voltage is to be applied at higher temperatures and which preferably has a small thickness.

BACKGROUND ART

Biaxially stretched polypropylene films have been suitably used as dielectric films for capacitors, such as high voltage capacitors, filter capacitors for various switching regulators, converters, inverters, and the like, and smoothing capacitors, among electric and electronic devices by utilizing excellent electrical properties, such as voltage resistance and low dielectric loss characteristics, and high moisture resistance of the polypropylene films. Polypropylene films have started to be used also as capacitors for inverter power supplies that regulate drive motors of electric cars, hybrid cars, and the like which have been increasingly in demand in recent years.

For such capacitors for inverter power supplies used in cars or the like, further reductions in size and weight of capacitors have been demanded along with the reductions in size and weight of vehicles. To reduce size and weight of a capacitor, as a film for capacitors, a polypropylene film with high stretching performance may be used and formed into an ultrathin film having a thickness of 1 to 6 μm, for example. Meanwhile, even for ultrathin films, high voltage resistance is required so that dielectric breakdown does not occur even when higher voltage is applied at higher temperatures. Furthermore, for capacitors based on such a film, it is required to have high voltage resistance, especially high initial voltage resistance and long-term voltage resistance, even when a high voltage is applied at a wide range of temperatures of −40° C. to 90° C., especially at high temperatures.

Regarding polypropylene film, for example, Patent Document 1 proposes to obtain a polypropylene film by biaxially-stretching a polypropylene resin having a predetermined number average molecular weight (Mn), molecular weight distribution (Mw/Mn or Mz/Mn), and melt flow rate to obtain a capacitor film that has excellent electrical insulation properties, antiblocking properties, and mechanical characteristics. However, the film described in Patent Document 1 is not expected to be used as a dielectric film for capacitors, and no investigation was conducted for effect on the voltage resistance at high temperatures.

Patent Document 2 proposes a biaxially stretched polypropylene film formed from a resin mixture obtained by adding, in a homopolymer (A) of isotactic polypropylene having a particular melt flow index (MFR), 1 mass % or more and 30 mass % or less of a homopolymer (B) of isotactic polypropylene having the MFR that is 1 to 30 g/10 min more than the MFR of the resin (A), to obtain an extremely thin surface-roughened biaxially stretched polypropylene film having excellent winding machining suitability. However, the polypropylene film formed from a resin, in which a large portion of the composition is low molecular components, may not always satisfy the high level of demands from the market in recent years regarding further reduction in the size of the capacitor element and regarding high initial voltage resistance and long-term durability at high temperatures.

CITATION LIST

Patent Literature

Patent Document 1: Japanese Unexamined Patent Application Publication No. 2004-175932A Patent Document 2: Japanese Unexamined Patent Application Publication No. 2010-254794A

SUMMARY OF INVENTION

Technical Problem

For a high-capacity capacitor to which high voltage is to be applied at a high temperature, it has been difficult to obtain a biaxially stretched polypropylene film for capacitors that fully satisfies the high level of demands from the market in recent years regarding further reduction in the size and even higher voltage resistance, especially initial voltage resistance and long-term voltage resistance, at high temperatures.

Therefore, an object of the present invention is to provide a biaxially stretched polypropylene film for capacitors, which has voltage resistance at high temperatures and excellent dielectric breakdown properties. Furthermore, another object is to provide a biaxially stretched polypropylene film for capacitors, which can be suitably used in a high-capacity capacitor to which a high voltage is to be applied at a high temperature and which preferably has a small thickness. Furthermore, yet another object is to provide a metallized polypropylene film for capacitors in which metal deposition is carried out on the biaxially stretched polypropylene film for capacitors described above, and a capacitor which is produced by using such a polypropylene film and has voltage resistance at high temperatures.

Solution to Problem

As a result of diligent research, the inventors of the present invention found that the objects described above can be achieved by the means described below and thus completed the present invention.

That is, the present invention includes the following preferred embodiments.

[1] A biaxially stretched polypropylene film for capacitors, where a polypropylene resin composing (constituting) the polypropylene film has a number average molecular weight of 40,000 or more and 100,000 or less, and a Z average molecular weight of 950,000 or more and 1,500,000 or less; wherein a difference calculated by subtracting a differential distribution value at Log(M)=6.0 from a differential distribution value at Log(M)=4.5 in a molecular weight distribution curve of the polypropylene resin is −15% or more and 11% or less.

[2] The biaxially stretched polypropylene film for capacitors according to [1] above, where a crystallite size of the polypropylene film is 12.2 nm or less when it is calculated from a half width of an α-crystal (040) plane reflection peak measured by wide angle X-ray diffractometry by the use of Scherrer equation.

[3] The biaxially stretched polypropylene film for capacitors according to [1] or [2] above, where the polypropylene film is obtained from a polypropylene resin composition by biaxial stretching and the polypropylene resin composition comprises a polypropylene resin having a melt flow rate of 4 g/10 min or less in the amount of 1 mass % or more and 70 mass % or less based on the total weight of polypropylene resins comprised in the polypropylene resin composition.

[4] The biaxially stretched polypropylene film for capacitors according to any one of [1] to [3] above, where the polypropylene film is obtained from a polypropylene resin composition by biaxial stretching and the polypropylene resin composition comprises a polypropylene resin having a number average molecular weight (Mn) of 40,000 or more and 150,000 or less and a Z average molecular weight of 1,200,000 or more and 2,600,000 or less in the amount of 1 mass % or more and 70 mass % or less based on the total weight of polypropylene resins comprised in the polypropylene resin composition.

[5] A metallized polypropylene film for capacitors, wherein metal deposition is carried out on one surface or both surfaces of the biaxially stretched polypropylene film for capacitors according to any one of [1] to [4] above.

[6] A capacitor produced by the use of the metallized polypropylene film for capacitors according to [5] above.

Advantageous Effects of Invention

According to the present invention, a biaxially stretched polypropylene film for capacitors, which has high voltage resistance at high temperatures and excellent dielectric breakdown properties, can be provided. Furthermore, a biaxially stretched polypropylene film for capacitors, which can be suitably used in a high-capacity capacitor to which a high voltage is to be applied at higher temperatures and which preferably has a small thickness, can be provided. Furthermore, according to the present invention, a capacitor which has high voltage resistance at high temperatures can be obtained.

DESCRIPTION OF EMBODIMENTS

The number average molecular weight (Mn) of the polypropylene resin constituting the polypropylene film of the present invention is 40,000 or more and 100,000 or less. The number average molecular weight (Mn) of the polypropylene resin is preferably 41,000 or more, and more preferably 42,000 or more, from the perspectives of thermomechanical property and stretchability of the film. The number average molecular weight (Mn) of the polypropylene resin is preferably 80,000 or less, and more preferably 60,000 or less, from the perspective of thickness precision of the film.

The Z average molecular weight (Mz) of the polypropylene resin constituting the polypropylene film of the present invention is 950,000 or more and 1,500,000 or less. The Z average molecular weight (Mz) of the polypropylene resin is preferably 960,000 or more, and more preferably 980,000 or more, from the perspective of voltage resistance. The Z average molecular weight (Mz) of the polypropylene resin is preferably 1,450,000 or less, and more preferably 1,400,000 or less, from the perspective of stretchability.

The number average molecular weight (Mn) and the Z average molecular weight (Mz) of the polypropylene resin can be measured by gel permeation chromatography (GPC) analysis. The GPC instrument used in the GPC analysis is not particularly limited, and a commercially available high temperature GPC instrument that can analyze the molecular weight of polyolefins, such as high temperature GPC instrument with built-in differential refractometer (RI), HLC-8121GPC-HT, manufactured by Tosoh Corporation, can be used. In this case, for example, measurement is performed by using three TSKgel GMHHR-H(20)HT, manufactured by Tosoh Corporation, connected as the GPC column, setting the column temperature to 140° C., and using trichlorobenzene as an eluent, at a flow rate of 1.0 mL/min. Typically, a calibration curve is created using a polystyrene standard, and a number average molecular weight (Mn) and a Z average molecular weight (Mz) are obtained based on calibration with the polystyrene. Furthermore, a logarithmic value of the weight average molecular weight obtained as described above is referred to as logarithmic molecular weight ("Log (M)").

In the polypropylene resin constituting the polypropylene film of the present invention, the difference calculated by subtracting a differential distribution value at a logarithmic molecular weight Log(M)=6.0 from a differential distribution value at Log(M)=4.5 in a molecular weight distribution curve is −15% or more and 11% or less. The difference is preferably −10% or more and 11% or less, and more preferably −8% or more and 11% or less. Such a polypropylene resin contains a predetermined proportion of a component having a molecular weight of approximately 10,000 to 100,000 relative to the amount of high molecular weight component having a molecular weight of approximately 1,000,000. As a result, the crystallite size can be made smaller while the thickness precision of the film is maintained, thereby making it easy to obtain a surface having a desired orientation and roughness.

Note that the difference of the differential distribution values indicates that the distribution value of the logarithmic molecular weight Log(M) between 4 to 5 (low molecular weight component) becomes a predetermined proportion relative to the distribution value of the logarithmic molecular weight Log(M) of approximately 6 (high molecular weight component) by using the differential distribution value at a logarithmic molecular weight Log(M)=4.5 as the representative distribution value of a component having a molecular weight of 10,000 to 100,000 (hereinafter, also referred to as "low molecular weight component") which is close to the value (40,000 to 100,000) of the number average molecular weight (Mn) of the polypropylene resin, and using the differential distribution value at Log(M)=6.0 as the representative distribution value of a component having a molecular weight of approximately 1,000,000 (hereinafter, also referred to as "high molecular weight component") which is close to the value (950,000 to 1,500,000) of the Z average molecular weight (Mz) of the polypropylene resin. Note that the molecular weight distribution values, such as Mz/Mn or Mw/Mn, simply indicates the range of the molecular weight distribution range and does not indicate the quantitative relationship between the high molecular weight component and the low molecular weight component thereof even when, for example, the range of the molecular weight distribution Mz/Mn or the like is specified. The polypropylene resin constituting the polypropylene film of the present invention has the predetermined number average molecular weight and Z average molecular weight and contains a predetermined proportion in the range described above of a component having a molecular weight of 10,000 to 100,000 relative to the amount of the component having a molecular weight of 1,000,000 as described above.

The differential distribution value described above can be measured by the following method. First, a time curve (generally, also referred to as "elution curve") of intensity distribution as detected using a differential refractometer (RI detector) of GPC is converted to a distribution curve for the molecular weight M (Log(M)) of the polystyrene standard by using a calibration curve created by using the polystyrene standard. An integrated distribution curve is then obtained with respect to the Log(M) of a case where a value of 100% is assigned to the total area of the distribution curve. A differential distribution curve with respect to the Log(M) is obtained by differentiating this integrated distribution curve with Log(M). From this differential distribution curve, the differential distribution values at Log(M)=4.5 and Log(M)=6.0 are read. Note that the series of operations to obtain the differential distribution curve described above can be performed using an analysis software installed in the GPC instrument.

The weight average molecular weight (Mw) of the polypropylene resin constituting the polypropylene film is preferably 250,000 or more and 450,000 or less. Use of such a polypropylene resin is preferred since resin flowability suitable for biaxial stretching can be obtained, control of the thickness of a cast sheet (extruded sheet) is facilitated, and thus a biaxially stretched polypropylene film that is formed into an ultrathin film and that is, for example, suitable for use in small and high-capacity capacitors can be obtained more easily. Furthermore, the use of such a polypropylene resin is preferred since unevenness of the thickness of the cast sheet and the biaxially stretched polypropylene film is less likely to occur. The weight average molecular weight (Mw) of the polypropylene resin is more preferably 270,000 or more, and even more preferably 290,000 or more, from the perspective of uniformity, mechanical characteristics, thermomechanical property, and the like of the biaxially stretched polypropylene film thickness. The weight average molecular weight (Mw) of the polypropylene resin is more preferably 400,000 or less from the perspectives of flowability of the polypropylene resin composition, and stretchability at the time when the biaxially stretched polypropylene film formed into an ultrathin film is obtained.

The molecular weight distribution (Mw/Mn) calculated as the ratio of the weight average molecular weight (Mw) to the number average molecular weight (Mn) of the polypropylene resin constituting the polypropylene film is preferably 6 or more and 12 or less. The molecular weight distribution (Mw/Mn) is more preferably 7 or more, and even more preferably 7.5 or more. The molecular weight distribution (Mw/Mn) is more preferably 11 or less, and even more preferably 10 or less. Use of such a polypropylene resin is preferred since resin flowability suitable for biaxial stretching can be obtained and a biaxially stretched propylene film that is formed into an ultrathin film without unevenness in the thickness can be obtained more easily. Furthermore, such a polypropylene resin composition is preferred also from the perspective of voltage resistance of the biaxially stretched polypropylene film.

The polypropylene resin constituting the polypropylene film preferably contains a polypropylene resin having a molecular weight distribution (Mz/Mn) calculated as the ratio of the Z average molecular weight (Mz) to the number average molecular weight (Mn) of 20 or more and 70 or less. The molecular weight distribution (Mz/Mn) is more preferably 24 or more. The molecular weight distribution (Mz/Mn) is more preferably 60 or less, and even more preferably 50 or less. Use of such a polypropylene resin is preferred since resin flowability suitable for biaxial stretching can be obtained and a biaxially stretched propylene film that is formed into an ultrathin film without unevenness in the thickness can be obtained more easily. Furthermore, such a polypropylene resin composition is preferred also from the perspective of voltage resistance of the biaxially stretched polypropylene film.

Note that, the weight average molecular weight (Mw) of the polypropylene resin can be measured by gel permeation chromatography (GPC) analysis similarly to the case of measuring the number average molecular weight (Mn) and the Z average molecular weight (Mz) described above. Furthermore, the molecular weight distribution (Mw/Mn) is calculated as the weight average molecular weight (Mw)/number average molecular weight (Mn) which is the ratio of the weight average molecular weight (Mw) to the number average molecular weight (Mn). The molecular weight distribution (Mz/Mn) is calculated as the Z average molecular weight (Mz)/number average molecular weight (Mn) which is the ratio of the Z average molecular weight (Mz) to the number average molecular weight (Mn).

Examples of the polypropylene resin constituting the polypropylene film include homopolymers of polypropylenes, such as isotactic polypropylene and syndiotactic polypropylene, and copolymers of polypropylene and polyethylene. From the perspective of heat resistance, the polypropylene resin is preferably an isotactic polypropylene, and more preferably an isotactic polypropylene obtained by homopolymerizing polypropylene in the presence of a catalyst for olefin polymerization.

The biaxially stretched polypropylene film for capacitors of the present invention can be obtained by biaxially stretching the polypropylene resin composition.

Examples of the polypropylene resin contained in the polypropylene resin composition include homopolymers of polypropylenes, such as isotactic polypropylene and syndiotactic polypropylene, and copolymers of polypropylene and polyethylene. From the perspective of heat resistance, the polypropylene resin is preferably an isotactic polypropylene, and more preferably an isotactic polypropylene obtained by homopolymerizing polypropylene in the presence of a catalyst for olefin polymerization.

The polypropylene resin contained in the polypropylene resin composition is not particularly limited as long as it has the number average molecular weight (Mn), the Z average molecular weight (Mz), and the difference of the differential distribution values described above, and may be, for example, one type of polypropylene resin obtained by multistage polymerization or the like or may be a blend of polypropylene resins obtained by combining two or more types of polypropylene resins.

Examples of the method of adjusting the number average molecular weight (Mn), the Z average molecular weight (Mz), the difference of the differential distribution values, and the like of the polypropylene resin constituting the polypropylene film of the present invention include a method that adjusts the molecular weight distribution by adjusting the polymerization conditions of the polypropylene resin contained in the polypropylene resin composition, a method that uses a decomposing agent, a method that performs decomposition treatment that selectively decomposes a high molecular weight component, a method that blends a resin having a different molecular weight, and the like.

When the number average molecular weight (Mn), the Z average molecular weight (Mz), the difference of the differential distribution values, and the like are adjusted by the polymerization conditions, use of a polymerization catalyst described below is preferable from the perspective of ease in adjustment. When the polypropylene resin is obtained by a multi-stage polymerization, the following method can be exemplified. The polymerization reaction is performed with a plurality of reaction vessels (reactor vessels) of a polymerization reaction vessel for a high molecular weight component and a reaction vessel for a low molecular weight or medium molecular weight component in the presence of a catalyst. The plurality of the reaction vessels may be used by connecting the reaction vessels in series or parallel for example. First, propylene and a catalyst are fed to the reaction vessel. With these components, a molecular weight adjusting agent, such as hydrogen, in an amount necessary to reach the required molecular weight of the polymer is mixed to perform the first polymerization reaction. For example, in the case of slurry polymerization, the reaction temperature is approximately from 70 to 100° C. and the retention time is approximately from 20 minutes to 100 minutes. The product of the first polymerization reaction is sent to the next reaction vessel successively or continuously together with additional propylene, a catalyst, and a molecular weight adjusting agent to perform the second polymerization reaction by performing adjustment so that a product with lower molecular weight or higher molecular weight than that of the first polymerization reaction is obtained. By adjusting the yields (amounts of productions) by the first and second polymerization reactions, the composition (constitution) of the high molecular weight component and low molecular weight component can be adjusted.

For example, a relatively high molecular weight polypropylene can be produced in the earlier stage of the polymerization and a relatively low molecular weight polypropylene can be produced in the latter stage of the polymerization. Specifically, in the case of the two-stage polymerization, it is preferable to produce the polypropylene with an intrinsic viscosity $[\eta_{1st}]$ of 2.5 to 10 dL/g, and preferably 2.5 to 7 dL/g, at the first stage in an amount that the content in the finally obtained polypropylene resin is from 0.5 to 40 mass %, and then produce the polypropylene with an intrinsic viscosity $[\eta_{2nd}]$ of 0.1 to 5 dL/g, and preferably 0.3 to 3 dL/g, at the second stage in an amount that the content of the finally obtained polypropylene resin is from 99.5 to 60 mass %.

Furthermore, in the case of the three-stage polymerization, it is preferable to produce the polypropylene with an intrinsic viscosity $[\eta_{1st}]$ of 2.5 to 10 dL/g, and preferably 2.5 to 7 dL/g, at the first stage in an amount that the content in the finally obtained polypropylene resin is from 0.5 to 40 mass %, then produce the polypropylene with an intrinsic viscosity $[\eta_{2nd}]$ of 0.1 to 5 dL/g, and preferably 0.3 to 3 dL/g, at the second stage in an amount that the content in the finally obtained polypropylene resin is from 20 to 99 mass %, and then produce the polypropylene with an intrinsic viscosity $[\eta_{3rd}]$ of 0.001 to 5 dL/g, and preferably 0.05 to 3 dL/g, at the third stage in an amount that the content in the finally obtained polypropylene resin is from 0.5 to 40 mass %.

As the catalyst, a typical Ziegler-Natta catalyst is preferably used. Furthermore, the catalyst to be used may contain a co-catalyst component or a donor. By suitably adjusting the catalyst or polymerization conditions, the molecular weight distribution can be controlled.

When the composition (constitution) of the high molecular weight component and the low molecular component of the polypropylene raw material resin is adjusted by peroxidative degradation, it is preferable to employ a method in which peroxidative treatment is performed with decomposing agents, such as hydrogen peroxide and organic peroxide. It is known that, when peroxide is added to a decomposable polymer like polypropylene, a reaction occurs by which hydrogen is extracted from the polymer, and although a portion of the resulting polymer radicals bond again and undergo crosslinking reaction, nearly all of the radicals undergo secondary decomposition (β-cleavage) are divided into two polymers having smaller molecular weights. Thus, there is a high probability that decomposition proceeds starting with the high molecular weight component, and accordingly, the low molecular weight component increases and the constitution of molecular weight distribution can be adjusted. An example of a method used to obtain a resin containing a suitable amount of a low molecular weight component by peroxidative decomposition is described below. An example of the method includes a method in which a powder or pellets of a polypropylene resin obtained by polymerization reaction, and an organic peroxide in the form of, for example, 1,3-bis(tertiary-butylperoxide isopropyl)benzene at approximately 0.001 mass % to 0.5 mass % are adjusted and added while considering the target composition (constitution) of the high molecular weight component and the low molecular weight component, and then melted and kneaded with a melt kneader at a temperature of approximately 180° C. to 300° C.

When the number average molecular weight (Mn), the Z average molecular weight (Mz), and the difference of the differential distribution values described above are adjusted by blending resins, from the perspective of ease in adjustment, the polypropylene resin composition is preferably obtained by mixing at least two types of resins having different molecular weights in dried or molten state.

In an embodiment of the present invention that obtains a polypropylene resin composition by blending resins, the polypropylene resin composition preferably contains a polypropylene resin A described below. The weight average molecular weight of the polypropylene resin A is preferably 250,000 or more and 450,000 or less, and more preferably 250,000 or more and 400,000 or less. When the polypropylene resin composition containing such a polypropylene resin A is used, a thin stretched film may be produced easily since the resin flowability is suitable and control of the thickness of the cast sheet is easy. Furthermore, such use is preferable since unevenness in the thickness of the sheet and film is less likely to occur and sheet may have suitable stretchability.

The molecular weight distribution (Mw/Mn) calculated as the ratio of the weight average molecular weight (Mw) to the number average molecular weight (Mn) of the polypropylene resin A is preferably 7.0 or more and 12.0 or less. The molecular weight distribution (Mw/Mn) is more preferably 7.0 or more and 11.0 or less, and even more preferably 7.2 or more and 10.0 or less. Use of a polypropylene resin composition containing such a polypropylene resin A is preferred since resin flowability suitable for biaxial stretching can be obtained and a biaxially stretched propylene film that is formed into an ultrathin film without unevenness in the thickness can be obtained more easily. Furthermore, such a polypropylene resin composition is preferred also from the perspective of voltage resistance of the biaxially stretched polypropylene film.

The molecular weight distribution (Mz/Mn) calculated as the ratio of the Z average molecular weight (Mz) to the number average molecular weight (Mn) of the polypropylene resin A is preferably 20 or more and 70 or less. The molecular weight distribution (Mz/Mn) is more preferably 25 or more and 60 or less, and even more preferably 25 or more and 50 or less. Use of a polypropylene resin composition containing such a polypropylene resin A is preferred since resin flowability suitable for biaxial stretching can be obtained and a biaxially stretched propylene film that is formed into an ultrathin film without unevenness of the thickness can be obtained more easily. Furthermore, such a polypropylene resin composition is preferred also from the perspective of voltage resistance of the biaxially stretched polypropylene film.

Note that, the weight average molecular weight (Mw), the number average molecular weight (Mn), and the Z average molecular weight (Mz) of the polypropylene resin A can be measured by gel permeation chromatography (GPC) analysis similarly to the case of measuring the weight average molecular weight (Mw) of the polypropylene resin or the like described above. Furthermore, the molecular weight distribution (Mw/Mn) is calculated as the weight average molecular weight (Mw)/number average molecular weight (Mn) which is the ratio of the weight average molecular weight (Mw) to the number average molecular weight (Mn). The molecular weight distribution (Mz/Mn) is calculated as the Z average molecular weight (Mz)/number average molecular weight (Mn) which is the ratio of the Z average molecular weight (Mz) to the number average molecular weight (Mn).

Furthermore, as the reference of the average molecular weight, melt flow rate (MFR) can also be used. In this case, the MFR of the polypropylene resin A is preferably 7 g/10 min or less, and more preferably 6 g/10 min or less, from the perspective of stretchability. Furthermore, from the perspective of enhancing the thickness precision of the biaxially stretched polypropylene film of the present invention, the MFR is preferably 4 g/10 min or more, and more preferably 4.5 g/10 min or more.

The mesopentad fraction ([mmmm]) of the polypropylene resin A is preferably 94.0% or more and 98.0% or less. The mesopentad fraction is more preferably 95.0% or more and 97.0% or less. When the polypropylene resin containing the polypropylene resin A is used, the crystallinity of the resin is suitably enhanced due to its suitably high stereoregularity, and initial voltage resistance and long-term voltage resistance are enhanced meanwhile desired stretchability can be achieved by appropriate solidification (crystallization) rate during formation of a cast sheet.

Mesopentad fraction ([mmmm]) is an indicator of stereoregularity that can be obtained by nuclear magnetic resonance (NMR) analysis. Specifically, for example, the mesopentad fraction can be measured by using JNM-ECP500, high temperature Fourier transform nuclear magnetic resonance (high temperature FT-NMR), manufactured by JEOL Ltd. The observed nucleus is $^{13}C$ (125 MHz), the measuring temperature is 135° C., and a mixed solvent of o-dichlorobenzene (ODCB) and deuterated ODCB (mixing ratio=4/1) can be used for the solvent to dissolve the polypropylene resin. High temperature NMR analysis can be carried out by, for example, the method described in "Polymer Analysis Handbook, New Edition, Japan Society for Analytical Chemistry—Research Committee of Polymer Analysis (ed.), Kinokuniya Co., Ltd., 1995, p. 610".

Single-pulse proton broad-band decoupling can be used for the measurement mode, the pulse width is 9.1 μsec (45° pulse), the pulse interval is 5.5 sec, the cumulative number of measurements is 4,500, and the chemical shift standard is $CH_3$ (mmmm) at 21.7 ppm.

Pentad fraction, which represents stereoregularity, is calculated as a percentage from the integrated intensity of each signal derived from a combination (such as mmmm, mrrm, and the like) of pentads consisting of pentads arranged in the same direction (mesopentads (m)) and pentads arranged in different directions (racemopentads (r)). For example, the description in "T. Hayashi, et al., Polymer, Vol. 29, p. 138 (1988)" or the like can be referred to regarding assignment of each signal derived from mmmm, mrrm, and the like.

The polypropylene resin composition contains preferably 55 mass % or more and 90 mass % or less, more preferably 60 mass % or more and 85 mass % or less, and particularly preferably 60 mass % or more and 80 mass % or less, of the polypropylene resin A relative to the total amount of the polypropylene resin contained in the polypropylene resin composition.

In an embodiment of the present invention, the polypropylene resin composition preferably contains a polypropylene resin B1 having a number average molecular weight (Mn) of 40,000 or more and 150,000 or less and a Z average molecular weight of 1,200,000 or more and 2,600,000 or less from the perspective of making the crystallite size smaller and obtaining a capacitor film with high voltage resistance.

The number average molecular weight (Mn) of the polypropylene resin B1 is preferably 40,000 or more and 150,000 or less, and more preferably 45,000 or more and 130,000 or less, from the perspective of stretchability. The Z average molecular weight of the polypropylene resin B1 is preferably 1,200,000 or more and 2,600,000 or less, more preferably 1,200,000 or more and 2,400,000 or less, even more preferably 1,200,000 or more and 2,000,000 or less, and particularly preferably 1,250,000 or more and 1,900,000 or less, from the perspective of enhancing thickness precision of the biaxially stretched polypropylene film of the present invention.

The polypropylene resin B1 containing the number average molecular weight (Mn) and the Z average molecular weight within the ranges described above is preferably contained in an amount of preferably 1 mass % or more, more preferably 5 mass % or more, even more preferably 10 mass % or more, and preferably 70 mass % or less, more preferably 60 mass % or less, and even more preferably 50 mass % or less, relative to the total amount of the polypropylene resin contained in the polypropylene resin composition from the perspectives of making the crystallite size smaller and obtaining a capacitor film with high voltage resistance.

Furthermore, as the reference of the average molecular weight, melt flow rate (MFR) can also be used. In this case, the polypropylene resin composition preferably contains a polypropylene resin B2 having a melt flow rate of 4 g/10 min or less from the perspectives of making the crystallite size smaller and obtaining a capacitor film with high voltage resistance.

The melt flow rate of the polypropylene resin B2 is preferably 4 g/10 min or less, more preferably 3.5 g/10 min or less, and particularly preferably 2.0 g/10 min or less from the perspectives of making the crystallite size smaller and obtaining a capacitor film with high voltage resistance. The melt flow rate of the polypropylene resin B2 is preferably 0.1 g/10 min or more, more preferably 0.2 g/10 min or more, and even more preferably 0.3 g/10 min or more, from the perspective of enhancing thickness precision of the biaxially stretched polypropylene film of the present invention.

The polypropylene resin B2 having the melt flow rate within the range described above is preferably contained in an amount of preferably 1 mass % or more, more preferably 5 mass % or more, even more preferably 10 mass % or more, and preferably 70 mass % or less, more preferably 60 mass % or less, and even more preferably 50 mass % or less, relative to the total amount of the polypropylene resin contained in the polypropylene resin composition from the perspectives of making the crystallite size smaller and obtaining a capacitor film with high voltage resistance.

When the content of the high molecular component is adjusted by blending of resins, the polypropylene resin composition is preferably obtained by mixing, relative to the polypropylene resin A, the polypropylene resin B1 having a higher molecular weight or the polypropylene resin B2 having a lower MFR in dried or molten state. For example, a method of obtaining a polypropylene resin composition which is a mixture system of two types of polypropylene resins by mixing a polypropylene resin B1 or B2 in an amount of preferably 1 to 70 mass %, more preferably 5 to 60 mass %, and even more preferably 10 to 50 mass %, relative to 100 mass % of the polypropylene resin A which is the main component is preferably employed since the amount of the high molecular component can be easily adjusted. Note that these resins may be mixed according to a non-limited, optional mixing method, including a method in which the polymerized powder or pellets thereof are dry-blended by a mixer or the like, a method by which a blended resin is obtained by melt-kneading the polymerized powder or pellets thereof using a kneader, or the like.

In the present invention, another resin (hereinafter, also referred to "other resin") excluding the polypropylene resin may be mixed in the polypropylene resin composition in a range that does not impair the effect of the present invention. Note that "other resin" is not particularly limited, and conventionally known resins that are not the polypropylene resins and that are suitable for use in capacitors can be appropriately used also in the present invention. Examples of the other resin include other polyolefins except polypropylene, such as polyethylene, poly(1-butene), polyisobutene, poly(1-pentene), and poly(1-methylpentene); copolymers of α-olefins, such as ethylene-propylene copolymers, propylene-butene copolymers, and ethylene-butene copolymers; vinyl monomer-diene monomer random copolymers, such as styrene-butadiene random copolymers; vinyl monomer-diene monomer-vinyl monomer random copolymers, such as styrene-butadiene-styrene block copolymers; and the like. The compounded amount of the other resin is preferably 10 parts by mass or less, and more preferably 5 parts by mass or less, relative to the total amount of the polypropylene resin 100 parts by mass contained in the polypropylene resin composition.

The polypropylene resin composition may contain at least one type of additive as necessary in addition to the polypropylene resin. The additive is not particularly limited as long as it is an additive ordinarily used in polypropylene resins. Examples of such an additive include stabilizers such as antioxidants, chlorine absorbers and ultraviolet absorbers, lubricants, plasticizers, flame retardants, antistatic agents, colorants, and the like. Such an additive may be added to the polypropylene resin composition in a range that does not impair the effect of the present invention.

The "antioxidant" is not particularly limited as long as it is an antioxidant ordinarily used in polypropylene. The antioxidant is typically used for two types of purposes. One of the purposes is to inhibit thermal degradation and oxidative degradation inside an extruder. The other purpose is to inhibit deterioration and contribute to enhancement of capacitor performance during long-term use as a capacitor film. The antioxidant that inhibits thermal degradation and oxidative degradation inside an extruder is referred to as "primary agent", and the antioxidant that contributes to enhancement of capacitor performance is referred to as "secondary agent". Two types of antioxidants may be used for these two purposes, or one type of antioxidant may be used for the two purposes.

When antioxidants are used for the two purposes, the polypropylene resin composition may contain, for example, as a primary agent, approximately from 1,000 ppm to 4,000 ppm of 2,6-di-tertiary-butyl-para-cresol (generic name: BHT) relative to the amount of the polypropylene resin (100 parts by mass). The antioxidant for this purpose is mostly consumed during a formation step in an extruder and hardly remains in the film after the film formation (and typically is present at a residual amount of less than 100 ppm).

As the secondary agent, a hindered phenol-based antioxidant having a carbonyl group can be used. Although the hindered phenol-based antioxidant having a carbonyl group that can be used in the present invention is not particularly limited, examples thereof include triethylene glycol bis[3-(3-tertiary-butyl-5-methyl-4-hydroxyphenyl)propionate] (trade name: Irganox 245), 1,6-hexanediol-bis[3-(3,5-di-tertiary-butyl-4-hydroxyphenyl)propionate] (trade name: Irganox 259), pentaerythrityl-tetrakis[3-(3,5-di-tertiary-butyl-4-hydroxyphenyl)propionate (trade name: Irganox 1010), 2,2-thio-diethylenebis[3-(3,5-di-tertiary-butyl-4-hydroxyphenyl)propionate] (trade name: Irganox 1035), octadecyl-3-(3,5-di-tertiary-butyl-4-hydroxyphenyl)propionate (trade name: Irganox 1076), N,N'-hexamethylenebis(3,5-di-tertiary-butyl-4-hydroxy-hydrocinnamide) (trade name: Irganox 1098), and the like. Among these, pentaerythrityl-tetrakis[3-(3,5-di-tertiary-butyl-4-hydroxyphenyl)propionate] is most preferable due to its high molecular weight, high compatibility with polypropylene, low volatility and superior heat resistance.

The hindered phenol-based antioxidant having a carbonyl group is contained in the polypropylene resin composition in an amount of preferably 2,000 ppm or more and 7,000 ppm or less, and more preferably 3,000 ppm or more and 7,000 or less, relative to the total amount of the polypropylene resin contained in the polypropylene resin composition, considering that it is substantially consumed in the extruder.

When the polypropylene resin composition does not contain the primary agent, the hindered phenol-based antioxidant having a carbonyl group may be used in a greater amount. In this case, since the amount of consumption of the hindered phenol-based antioxidant having a carbonyl group in the extruder increases, the hindered phenol-based antioxidant having a carbonyl group is preferably added at an amount of 3,000 ppm or more and 8,000 ppm or less per 100 parts by mass of the polypropylene resin.

In the present invention, to inhibit degradation that proceeds over time during a long-term use of the biaxially stretched polypropylene film, one or more types of the hindered phenol-based antioxidants having a carbonyl group (secondary agent) may be contained. The content of the hindered phenol-based antioxidant in the film is preferably 1,000 ppm or more and 6,000 ppm or less, and more preferably 1,500 ppm or more and 6,000 ppm or less, relative to the total amount of the polypropylene resin contained in the polypropylene resin composition.

A film capacitor, which contains a particular, appropriate range of amount of the hindered phenol-based antioxidant having a carbonyl group that has suitable miscibility with polypropylene on a molecular scale, is preferable since long-term durability is enhanced without reducing electrostatic capacitance (without allowing degradation to proceed) over a long period of time even in life test at extremely high temperatures while high voltage resistance is maintained.

The polypropylene resin composition may contain a phosphorous-based antioxidant as the antioxidant. The phosphorous-based antioxidant can inhibit degradation of resin by inhibiting homolytic cleavage of the organic peroxide. Examples of the phosphorous-based antioxidant include tris(2,4-di-t-butylphenyl) phosphite (trade name: Irgafos 168), bis(2,4-di-t-butyl-6-methylphenyl) ethylphosphite (trade name: Irgafos 38), and the like. The phosphorous-based antioxidant is preferably added in an amount of approximately 1,000 ppm to 2,000 ppm per 100 parts by mass of the polypropylene resin.

As the antioxidant, the polypropylene resin composition may contain a single type of the antioxidant described above, may contain a combination of BHT and the hindered phenol-based antioxidant, or may contain a combination of the phosphorous-based antioxidant and BHT and/or the hindered phenol-based antioxidant, for example. A combination of the phosphorous-based antioxidant and the hindered phenol-based antioxidant is preferable since a strong synergistic effect can be obtained.

The "chlorine absorber" is not particularly limited as long as it is a chlorine absorber ordinarily used in polypropylene. Examples of the chlorine absorber include metal soap, such as calcium stearate.

The "ultraviolet absorber" is not particularly limited as long as it is an ultraviolet absorber ordinarily used in polypropylene. Examples of the ultraviolet absorber include benzotriazole (Tinuvin 328, manufactured by BASF, and the like), benzophenone (Cysorb UV-531, manufactured by Cytec, and the like), hydroxybenzoate (UV-CHEK-AM-340, manufactured by Ferro), and the like.

The "lubricant" is not particularly limited as long as it is a lubricant ordinarily used in polypropylene. Examples of the lubricant include primary amide (stearamide and the like), secondary amide (N-stearyl stearamide and the like), ethylene bis amide (N,N'-ethylene bis stearamide and the like), and the like.

The "plasticizer" is not particularly limited as long as it is a plasticizer ordinarily used in polypropylene. Examples of the plasticizer include PP random copolymers and the like.

The "flame retardant" is not particularly limited as long as it is a flame retardant ordinarily used in polypropylene. Examples of the flame retardant include halogen compounds, aluminum hydroxides, magnesium hydroxides, phosphates, borates, antimony oxides, and the like.

The "antistatic agent" is not particularly limited as long as it is an antistatic agent ordinarily used in polypropylene. Examples of the antistatic agent include glycerin monoester (glycerin monostearate and the like), ethoxylated secondary amines, and the like.

The "colorant" is not particularly limited as long as it is a colorant ordinarily used in polypropylene. Examples of the colorant include cadmium- or chromium-containing inorganic compounds and azo- or quinacridone-organic pigments.

In the present invention, the polypropylene resin contained in the polypropylene resin composition can be produced using a conventionally known method. Examples of the polymerization method include vapor phase polymerization, bulk polymerization, and slurry polymerization. The polymerization may be a single-stage polymerization using one polymerization reaction vessel, or may be a multi-stage polymerization using two or more polymerization reaction vessels. Furthermore, polymerization may be performed by adding hydrogen or a comonomer as a molecular weight adjusting agent in a reaction vessel. As the polymerization catalyst, a conventionally known Ziegler-Natta catalyst can be used, and the polymerization catalyst may contain a co-catalyst component or a donor. The molecular weight, molecular weight distribution, stereoregularity, and the like of the polypropylene resin can be controlled by appropriately adjusting the polymerization catalyst and other polymerization conditions.

When a plurality of polypropylene raw material resins is mixed and used as the polypropylene resin composition in an embodiment of the present invention, the mixing method is not particularly limited; however, examples thereof include a method in which powder-like or pellet-like resins are dry-blended by a mixer or the like, a method by which a blended resin is obtained by melt-kneading powder-like or pellet-like resins in a kneader, and the like.

The mixer that can be used is not particularly limited, and a Henschel mixer, ribbon blender, Banbury mixer, or the like can be used. Furthermore, the kneader that can be used is also not particularly limited, and any of a single screw type, twin screw type, or multi screw type with more than two screws can be used. In the case of twin or multi screw type, any type of kneading with rotation in the same direction or in the opposite direction can be used.

In the case of blending by melt-kneading, the kneading temperature is not particularly limited as long as suitable kneading can be performed; however, typically, the temperature is in a range of 200° C. to 300° C., and preferably 230° C. to 270° C. Kneading at too high temperature is not preferable since the resin may be degraded. To inhibit the degradation during kneading and mixing of the resin, an inert gas, such as nitrogen, may be purged in the kneader. Mixed polypropylene raw material resin pellets can be obtained by pelletizing the melt-kneaded resin into an appropriate size using a conventionally known pelletizer.

The total ash content caused by the polymerization catalyst residues or the like contained in the polypropylene raw material resin in the present invention is preferably as low as possible to enhance electrical properties. The total ash content is preferably 200 ppm or less, more preferably 100 ppm or less, and particularly preferably 75 ppm or less relative to the amount of the polypropylene resin (100 parts by mass).

The biaxially stretched polypropylene film for capacitors of the present invention is a polypropylene film formed by biaxially stretching the polypropylene resin composition described above. From the perspective of voltage resistance, the biaxially stretched polypropylene film for capacitors of the present invention preferably has a crystallite size of 12.2 nm or less when it is calculated from a half width of an α-crystal (040) plane reflection peak measured by wide angle X-ray diffractometry by the use of the Scherrer equation.

In the present invention, "crystallite size" of a polypropylene film indicates the crystallite size calculated from a half width of an α-crystal (040) plane reflection peak of the polypropylene film measured by wide angle X-ray diffractometry (XRD method) by the use of the Scherrer equation described below.

The crystallite size of the polypropylene film is more preferably 12.0 nm or less. Use of a polypropylene film having a small crystallite size within the range described above is preferable from the perspective of achieving heat resistance, voltage resistance, and long-term heat resistance and voltage resistance since leakage current is made smaller and occurrence of structural disorder due to Joule heating is suppressed. The crystallite size of the polypropylene film is preferably 10.0 nm or more, and more preferably 10.5 nm or more, from the perspective of maintaining mechanical strength and melting point of the polypropylene film.

Specifically, the "crystallite size" of the polypropylene film of the present invention can be determined as described below. First, the wide angle X-ray diffractometry is carried out on the biaxially stretched polypropylene film or the metallized film thereof to determine the half width of the obtained α-crystal (040) plane reflection peak. Then, from the obtained half width of the α-crystal (040) plane reflection peak, the crystallite size is determined using the Scherrer equation expressed by Formula (1) below. Note that, in the present invention, the shape factor K is taken to be 0.94.

[Mathematical Formula 1]

$$D = K \times \lambda / (\beta \times \cos \theta) \quad (1)$$

Note that D is the crystallite size (nm), K is a constant (shape factor), λ is the used X-ray wavelength (nm), β is the determined half width, and θ is the Bragg angle.

The biaxially stretched polypropylene film of the present invention can be obtained by biaxially stretching the polypropylene resin composition described above according to an ordinary method. In the present invention, a "cast sheet before stretching" to produce the biaxially stretched polypropylene film is preferably formed first using a publicly known method. For example, unstretched cast sheet can be formed by supplying polypropylene resin pellets, dry mixed polypropylene resin pellets and/or powder, or mixed polypropylene resin pellets produced by melt-kneading in advance to an extruder, melt-heating and passing through a filter, then melt-extruding from a T-die by heating and melting at 170° C. to 320° C., and preferably from 200° C. to 300° C., and cooling and solidifying in at least one metal drum held at typically from 80° C. to 140° C., preferably from 90° C. to 120° C., and more preferably from 90° C. to 105° C. The thickness of the cast sheet is preferably from 0.05 mm to 2 mm, and more preferably from 0.1 mm to 1 mm.

The biaxially stretched polypropylene film can be produced by subjecting the polypropylene cast sheet to stretching treatment. As the stretching, biaxial stretching that stretches biaxially in longitudinal and lateral directions is performed, and examples of the stretching method include simultaneous or successive biaxial stretching method. However, a successive biaxial stretching method is preferred. A successive biaxial stretching method includes, for example, first maintaining the cast sheet at a temperature of 100° C. to 160° C., stretching 3-fold to 7-fold in the direction of flow by passing the sheet between rolls provided with different speeds, and immediately cooling the sheet to room temperature. After the stretched film is introduced to a tenter to stretch 3-fold to 11-fold in the width direction at a temperature of 160° C. or higher, the film is subjected to relaxation and heat fixing, and then wound. The wound film is subjected to aging treatment in an atmosphere at approximately 20° C. to 45° C., after which it can be cut into a desired product width.

The thickness of the biaxially stretched polypropylene film used to produce a metallized polypropylene film is preferably from 1 to 6 μm from the perspective of obtaining a small and high-capacity capacitor element. Use of the biaxially stretched polypropylene film having a thickness of 1.5 μm or more is more preferable. Furthermore, the used biaxially stretched polypropylene film has been preferably made into a thin film, and the thickness thereof is preferably 5 μm or less, more preferably 4 μm or less, and even more preferably 3 μm or less. The thickness of the film can be measured in accordance with JIS-C2330 using a paper thickness tester, micrometer (JIS-B7502), or the like.

By such a stretching step, the stretched film which has excellent mechanical strength and rigidity and in which surface irregularities are more clearly defined and finely roughened can be formed. The surface of the biaxially stretched polypropylene film is preferably imparted with suitable surface roughness that results in favorable capacitor characteristics while improving winding suitability.

On at least one surface of the biaxially stretched polypropylene film, the surface roughness thereof is preferably 0.03 μm or more and 0.08 μm or less in terms of the center line average roughness (Ra), and the surface is preferably finely roughened to have the maximum height (Rz, formerly "Rmax" as defined in JIS) of 0.3 μm or more and 0.8 μm or less. When Ra and Rz are within the suitable ranges described above, the surface can be finely roughened, and wrinkles are less likely to be formed during process of winding an element, thereby winding can be suitably performed during capacitor processing. Furthermore, since uniform contact becomes possible between the films, voltage resistance and long-term voltage resistance can be also enhanced.

Note that "Ra" and "Rz" (formerly "Rmax" as defined in JIS) are values measured using, for example, a contact probe-type surface roughness tester (e.g. contact probe-type surface roughness tester with a diamond stylus or the like) that is ordinarily widely used in accordance with a method stipulated in JIS-B0601:2001 or the like. More specifically, for example, "Ra" and "Rz" can be determined in accordance with a method stipulated in JIS-B0601:2001 using a three-dimensional surface roughness tester, Surfcom model 1400D-3DF-12, manufactured by Tokyo Seimitsu Co., Ltd.

As the method of imparting fine roughness to the film surface, various publicly known surface roughening methods, such as embossing method and etching method, can be employed. Among these, a surface roughening method using β crystals is preferable since there is no need to introduce impurities. The rate at which β crystals are formed can typically be controlled by changing casting temperature and casting speed. Furthermore, the melting/transformation ratio of β crystals can be controlled with the roll temperature of the longitudinal stretching step, and fine roughness can be achieved by selecting the optimum production conditions for these two parameters of β crystal formation and their melting/transformation.

For the biaxially stretched polypropylene film, corona discharge treatment may be performed online or offline following completion of the stretching and heat fixing steps to enhance adhesive properties in post-processing such as a metal vapor deposition processing step. The corona discharge treatment can be performed by a publicly known method. As the atmosphere gas, air, carbon dioxide gas, nitrogen gas, or a mixed gas of these are preferably used.

In the step of producing a metallized polypropylene film, a metal vapor deposition film is formed on one surface of the biaxially stretched polypropylene film. Examples of the method of forming a metal vapor deposition film on the biaxially stretched polypropylene film include vacuum deposition methods, sputtering methods, and the like. From the perspectives of productivity, economical efficiency, and the like, a vacuum deposition method is preferable. When the metal vapor deposition film is formed by the vacuum deposition method, the method is appropriately selected from publicly known methods including those using a crucible and those using a wire. As the metal constituting the metal vapor deposition film, elementary metals, such as zinc, lead, silver, chromium, aluminum, copper, and nickel, mixtures of multiple types of these metals, alloys, and the like can be used. From the perspectives of environment, economical efficiency, film capacitor performance, especially temperature characteristics of insulation resistance and electrostatic capacitance, and frequency characteristics of insulation resistance and electrostatic capacitance, use of an elementary metal selected from zinc and aluminum, metal mixture, or alloy as the metal constituting the metal vapor deposition film is preferable.

The film resistance of the metal vapor deposition film is preferably from 1 to $100\Omega/\square$ from the perspective of electrical properties of the capacitor. From the perspective of self healing characteristics, the film resistance is preferably relatively high within this range, and more preferably $5\Omega/\square$ or more, and even more preferably $10\Omega/\square$ or more. Furthermore, from the perspective of safety as a capacitor element, the film resistance is more preferably $50\Omega/\square$ or less, and even more preferably $20\Omega/\square$ or less. The film resistance of the metal vapor deposition film can be measured during metal vapor deposition by, for example, two-terminal sensing that is known to one skilled in the art. The film resistance of the metal vapor deposition film can be adjusted by adjusting the vaporized amount by adjusting the output of the vaporization source, for example.

When the metal vapor deposition film is formed on one surface of the present biaxially stretched polypropylene film, an insulating margin is formed by excluding a certain width from an edge of one side of the film from the deposition so that a capacitor is formed when the obtained metallized polypropylene film is wound. Furthermore, to strengthen the bonding between the metallized polypropylene film and the metalicon electrodes (end electrodes sprayed with metal), a heavy edge structure is preferably formed on the other edge relative to the insulating margin. The film resistance of the heavy edge is typically from 2 to $8\Omega/\square$, and more preferably from 3 to $6\Omega/\square$.

Although the margin pattern of the metal vapor deposition film to be formed is not particularly limited, from the perspective of safety of the film capacitor or the like, a pattern containing a so-called special margin such as a fishnet pattern and T-margin pattern is preferable. Formation of the metal vapor deposition film in a pattern containing the special margin on one side of the biaxially stretched polypropylene film is preferable since safety of the resulting film capacitor is enhanced and breakage and/or short circuit of the film capacitor can be inhibited. As the method of forming the margin, conventionally known methods, such as a tape method in which masking is performed using tape during deposition, and an oil method in which masking is performed by applying oil, can be used without any restrictions.

The biaxially stretched polypropylene film provided with the metal vapor deposition film (that is, metallized polypropylene film) is processed to be a metallized polypropylene film capacitor after undergoing a winding process in which the film is wound up in the longitudinal direction of the film. That is, a pair of two metallized polypropylene films produced as described above is wound around in a manner that the metal vapor deposition film and the biaxially stretched polypropylene film are overlaid and laminated alternately, and then a pair of metalicon electrodes is formed by subjecting the both end faces to thermal spraying of a metal to produce a film capacitor element.

In the step of producing a film capacitor element, winding processing of the film is performed. For example, a pair of two metallized polypropylene films is overlaid and wound around in a manner that the metal vapor deposition part and the biaxially stretched polypropylene film are laminated alternately and that the insulating margin part is located on the other side. At this time, a pair of the two metallized polypropylene films is preferably laminated in a manner that the positions are shifted by 1 to 2 mm. The winder to be used is not particularly limited, and for example, the Automatic Winder model 3KAW-N2, manufactured by Kaido Mfg. Co., Ltd., or the like can be used.

After the winding, typically, heat treatment is performed on the obtained wound product by applying pressure (hereinafter, also referred to as "hot pressing"). When tightening of the winding of the film capacitor element or change in crystal structure are appropriately caused by hot pressing, mechanical and thermal stability can be achieved. However, when the winding of the element is excessively tightened or change in crystal structure is excessively caused by hot pressing, the film may be thermally damaged and shrunk and problems of formation failure, such as wrinkles caused by heat and embossing failure, may occur. Because of these points, the applied pressure is preferably from $10\times10^4$ to $450\times10^4$ Pa, more preferably from $30\times10^4$ to $300\times10^4$ Pa, and even more preferably from $40\times10^4$ to $150\times10^4$ Pa, although the optimum value varies depending on the thickness of the polypropylene film or the like. Furthermore, the temperature of heat treatment is preferably from 100 to 120° C. The duration of the heat treatment is preferably 5 hours or longer, and more preferably 10 hours or longer, from the perspective of achieving mechanical and thermal stability; however, from the perspective of preventing formation failure, such as wrinkles caused by heat and embossing failure, the duration is preferably 20 hours or shorter, and more preferably 15 hours or shorter.

Subsequently, a film capacitor element is produced by forming metalicon electrodes by subjecting the both end faces of the wound product to thermal spraying of a metal. Typically, lead wires are welded to the metalicon electrodes. Furthermore, to impart weatherability, especially to inhibit degradation by moisture, the capacitor element is preferably sealed in a case and potted in an epoxy resin.

A predetermined heat treatment is further performed on the metallized polypropylene film capacitor element produced by the method described above. That is, heat treatment at a temperature of 80 to 115° C. for 1 hour or longer is performed on the film capacitor element (hereinafter, also referred to as "heat aging").

In the step of performing heat treatment on the film capacitor element described above, the temperature of the heat treatment is 80° C. or higher, and preferably 90° C. or higher, but 115° C. or lower, and more preferably 110° C. or lower. The effect of heat aging can be achieved by performing the heat treatment at the temperature described above.

Specifically, it is conceived that corona discharge is suppressed by reducing the gaps between films constituting the capacitor element formed from the metallized polypropylene film and crystallization proceeds due to the change in internal structure of the metallized polypropylene film, and as a result, voltage resistance is enhanced. When the temperature of the heat treatment is lower than the predetermined temperature, the effect of the heat aging cannot be obtained sufficiently. On the other hand, when the temperature of the heat treatment is higher than the predetermined temperature, pyrolysis, oxidative degradation, or the like may occur in the polypropylene film.

As the method of performing the heat treatment on the film capacitor element, for example, the method can be appropriately selected from publicly known methods, such as a method that uses a thermostatic chamber or a method that uses a high frequency induction heating in an air atmosphere, vacuum atmosphere, or inert gas atmosphere; however, a method of using a thermostatic chamber is preferably employed.

The capacitor element obtained by the method described above is a small and high-capacity film capacitor element formed from the metallized polypropylene film and has high voltage resistance at high temperatures and long-term durability at high temperatures. Examples of the test method to determine the durability of the capacitor element include "step-up test", "life (service life) test", and the like. Both of these are test methods to evaluate durability at high temperatures of 100° C. or higher. The "step-up test" is a test method that repeatedly applies a certain voltage to a capacitor element for a certain period of time (short period of time) while the applied voltage is increased little by little as the application of voltage is repeated, and is a method to evaluate the durability of the capacitor element from the perspective of voltage limit (high voltage). Meanwhile, the "life test" is a test method that applies a certain voltage to a capacitor element for a long period of time, and is a method to evaluate long-term voltage resistance, i.e., the durability of the capacitor element from the perspective of the time period in which no reduction in electrostatic capacitance and no runaway occur. The details of each of the test methods are as described below.

In the capacitor element of the present invention, for example, when the thickness thereof is 2.5 μm, the voltage at the time when the rate of change in capacitance ΔC is −5% evaluated according to the "step-up test" is preferably more than 1,100 V, more preferably 1,120 V or more, even more preferably 1,150 V or more, and particularly preferably 1,180 V or more, although this varies also depending on the film thickness. Furthermore, the voltage at the time when the rate of change in capacitance ΔC is −95% evaluated according to the "step-up test" is preferably more than 1,450 V, more preferably 1,460 V or more, even more preferably 1,470 V or more, and particularly preferably 1,480 V or more.

Furthermore, in the capacitor element of the present invention, the rate of change in capacitance ΔC after application of the voltage evaluated according to the "life test" (after 200 hours) is preferably −10% or more, more preferably −8% or more, even more preferably −6% or more, and particularly preferably −5% or more. The rated voltage for high voltage type capacitor for hybrid cars is typically from 400 to 800 $V_{DC}$, and the "life test" may be performed using the voltage to be applied of 600 $V_{DC}$.

EXAMPLES

The present invention will be further described using examples below; however, these examples are used to describe the present invention and do not limit the present invention. Furthermore, unless otherwise noted, the expression "part" indicates "part by mass", and the expression "%" indicates "mass %".

Measurement of Values for Resin Characteristics (1) Weight Average Molecular Weight (Mw), Number Average Molecular Weight (Mn), Z Average Molecular Weight (Mz), and Differential Distribution Value Using gel permeation chromatography (GPC), the average molecular weight and differential distribution value of the distribution curve of the polypropylene resin were measured under the following conditions.

Measuring instrument: High-temperature GPC with built-in differential refractometer (RI), model HLC-8121GPC-HT, manufactured by Tosoh Corporation Column: Three coupled TSKgel GMHHR-H(20)HT columns, manufactured by Tosoh Corporation Column temperature: 140° C.

Eluent: Trichlorobenzene

Flow rate: 1.0 mL/min

Note that polystyrene standard, manufactured by Tosoh Corporation, was used to create the calibration curve, and the measurement results were obtained based on the calibration with polystyrene. However, the molecular weight was converted to a molecular weight of polypropylene using a Q factor.

The differential distribution value was obtained by the following method. First, a time curve (elution curve) of intensity distribution as detected using an RI detector was converted to a distribution curve for the molecular weight M (Log(M)) of the polystyrene standard by using a calibration curve created by using the polystyrene standard. An integrated distribution curve was then obtained with respect to the Log(M) of a case where a value of 100% is assigned to the total area of the distribution curve. Then, a differential distribution curve with respect to the Log(M) was obtained by differentiating this integrated distribution curve with Log(M). From this differential distribution curve, the differential distribution values at Log(M)=4.5 and Log(M)=6.0 were read. Note that the series of operations to obtain the differential distribution curve were performed using an analysis software installed in the used GPC instrument.

(2) Melt Flow Rate

The melt flow rate was measured at 230° C. in accordance with JIS K 7210-1999.

Polypropylene Resin

For the production of the polypropylene films of working examples and comparative examples, polypropylene resins having a number average molecular weight (Mn), weight average molecular weight (Mw), Z average molecular weight (Mz), molecular weight distribution (Mw/Mn), molecular weight distribution (Mz/Mn), and MFR shown in Table 1 below were used. Note that these values were values measured in accordance with the measurement methods described above in the form of raw material resin pellets.

Note that PP-4 was obtained by mixing 80 mass % of isotactic polypropylene resin (manufactured by Prime Polymer Co., Ltd.) having the Mw of 300,000, the Mw/Mn of 5.2, and the MFR of 4.0 g/10 min and 20 mass % of isotactic polypropylene resin (manufactured by Prime Polymer Co., Ltd.) having the MFR of 10.0 g/10 min.

TABLE 1

|      | Mn/$10^4$ | Mw/$10^4$ | Mz/$10^4$ | Mw/Mn | Mz/Mn | MFR (g/10 min) |
|------|-----------|-----------|-----------|-------|-------|----------------|
| PP-1 | 3.6       | 31        | 120       | 8.6   | 33.3  | 4.6            |
| PP-2 | 12        | 58        | 180       | 4.8   | 15.0  | 0.35           |
| PP-3 | 4.5       | 34        | 130       | 7.6   | 28.9  | 3.1            |
| PP-4 | 5.5       | 25        | 63        | 4.5   | 11.5  | 4.7            |
| PP-5 | 7.4       | 30        | 76        | 4.1   | 10.3  | 3.0            |
| PP-6 | 8.9       | 54        | 240       | 6.1   | 27.0  | 0.5            |
| PP-7 | 8.9       | 51        | 160       | 5.7   | 18.0  | 0.5            |
| PP-8 | 9.2       | 40        | 110       | 4.3   | 12.0  | 1.6            |

Polypropylene resin PP-1: Isotactic polypropylene (manufactured by Prime Polymer Co., Ltd.)

Polypropylene resin PP-2: Isotactic polypropylene (manufactured by Japan Polypropylene Corporation)

Polypropylene resin PP-3: Isotactic polypropylene (manufactured by Korea Petrochemical Ind. Co., Ltd.)

Polypropylene resin PP-4: Isotactic polypropylene

Polypropylene resin PP-5: Isotactic polypropylene (manufactured by Prime Polymer Co., Ltd.)

Polypropylene resin PP-6: Isotactic polypropylene (manufactured by Korea Petrochemical Ind. Co., Ltd.)

Polypropylene resin PP-7: Isotactic polypropylene (manufactured by Prime Polymer Co., Ltd.)

Polypropylene resin PP-8: Isotactic polypropylene (manufactured by Prime Polymer Co., Ltd.)

All of the polypropylene resins PP-1 to PP-8 contain at least one type of antioxidant selected from the group consisting of 2,000 ppm of 2,6-di-t-butyl-p-cresol (generic name: BHT) as the antioxidant (primary agent), from 3,000 to 6,500 ppm of pentaerythrityl-tetrakis[3-(3,5-di-t-butyl-4-hydroxyphenyl)propionate (trade name: Irganox 1010) as the hindered phenol-based antioxidant having a carbonyl group (secondary agent), and from 1,000 to 2,000 ppm of tris(2,4-di-t-butylphenyl) phosphite (trade name: Irgafos 168) as the phosphate-based antioxidant.

Using the polypropylene resins described above, the polypropylene resin compositions having a composition shown in Tables 2 and 3 were produced according to the method described below. The obtained polypropylene resin compositions were biaxially stretched to produce the polypropylene films of Working Examples 1 to 6 and Comparative Examples 1 to 4. The physical properties of the polypropylene resin constituting each of the films were measured according to the measurement methods described above. Furthermore, for the obtained polypropylene film, the dielectric breakdown voltage and the crystallite size were evaluated by the methods described below. The obtained results are shown in Tables 2 and 3.

TABLE 2

| | Working Example | | | | | |
|---|---|---|---|---|---|---|
| Polypropylene resin | 1 | 2 | 3 | 4 | 5 | 6 |
| PP-1 | 80 | 65 | 65 | 65 | 65 | 65 |
| PP-2 | 20 | 35 | — | — | — | — |
| PP-3 | — | — | 35 | — | — | — |
| PP-4 | — | — | — | — | — | — |
| PP-5 | — | — | — | — | — | — |
| PP-6 | — | — | — | 35 | — | — |
| PP-7 | — | — | — | — | 35 | — |
| PP-8 | — | — | — | — | — | 35 |
| Mn/$10^4$ | 4.2 | 4.6 | 4.0 | 4.4 | 5.1 | 4.2 |
| Mw/$10^4$ | 33 | 37 | 29 | 35 | 32 | 28 |
| Mz/$10^4$ | 120 | 130 | 98 | 144 | 104 | 95 |
| Mw/Mn | 7.9 | 8.0 | 7.3 | 7.9 | 6.2 | 6.6 |
| Mz/Mn | 28.6 | 28.3 | 24.5 | 32.9 | 20.2 | 22.7 |
| Log(M) = 4.5 | 30.7 | 26.7 | 34.1 | 28.8 | 27.6 | 29.8 |
| Log(M) = 6.0 | 27.6 | 31.2 | 23.7 | 28.5 | 30.1 | 25.5 |
| Difference of differential distribution values (%) | 3.1 | −4.5 | 10.3 | 0.3 | −2.5 | 4.3 |
| Dielectric breakdown voltage ($V_{DC}$/μm) | 543 | 571 | 527 | 558 | 549 | 524 |
| Crystallite size (nm) | 11.6 | 11.2 | 12.2 | 12.1 | 11.9 | 12.1 |

TABLE 3

| | Comparative Example | | | |
|---|---|---|---|---|
| Polypropylene resin | 1 | 2 | 3 | 4 |
| PP-1 | 100 | — | — | — |
| PP-2 | — | 100 | — | — |
| PP-3 | — | — | — | — |
| PP-4 | — | — | 100 | — |
| PP-5 | — | — | — | 100 |
| Mn/$10^4$ | 3.9 | 11 | 5.2 | 7.3 |
| Mw/$10^4$ | 29 | 54 | 25 | 30 |
| Mz/$10^4$ | 100 | 150 | 63 | 75 |
| Mw/Mn | 7.4 | 4.9 | 4.8 | 4.1 |
| Mz/Mn | 25.6 | 13.6 | 12.1 | 10.3 |
| Log(M) = 4.5 | 35.0 | 14.2 | 30.5 | 24.5 |
| Log(M) = 6.0 | 23.3 | 47.8 | 19.1 | 24.0 |
| Difference of differential distribution values (%) | 11.7 | −33.6 | 11.4 | 0.5 |
| Dielectric breakdown voltage ($V_{DC}$/μm) | 437 | —[\*1] | 404 | 354 |
| Crystallite size (nm) | 13.9 | —[\*1] | 12.5 | 12.0 |

[\*1]Not measured because stretching was not possible

Working Example 1

A weighed and mixed dry-blended pellets of the resin PP-1 (5,000 ppm of Irganox 1010 was added as an antioxidant) and the resin PP-2 (5,000 ppm of Irganox 1010 was added as an antioxidant) mixed at a ratio of PP-1/PP-2=80/20 (mass ratio) were continuously supplied to an extruder. The dry-blended pellets was melted at a temperature of 250° C., then extruded from a T-die, wound around a metal drum on which the surface temperature was maintained at 92° C., and solidified to produce a cast sheet having a thickness of approximately 125 μm. This cast sheet was stretched 5-fold in the direction of flow at a temperature of 140° C., cooled immediately to room temperature, and stretched 10-fold in the lateral direction at a temperature of 165° C. using a tenter to obtain an extremely thin biaxially stretched polypropylene film having a thickness of 2.3 μm.

Working Example 2

A biaxially stretched polypropylene film was obtained in the same manner as in Working Example 1 except for weighing and mixing the resin PP-1 and the resin PP-2 at a ratio of PP-1/PP-2=65/35 (mass ratio).

Reference Example 3

A biaxially stretched polypropylene film was obtained in the same manner as in Working Example 1 except for weighing and mixing the resin PP-1 and the resin PP-3 at a ratio of PP-1/PP-3=65/35 (mass ratio).

Working Example 4

A biaxially stretched polypropylene film was obtained in the same manner as in Working Example 1 except for weighing and mixing the resin PP-1 and the resin PP-6 at a ratio of PP-1/PP-6=65/35 (mass ratio).

Working Example 5

A biaxially stretched polypropylene film was obtained in the same manner as in Working Example 1 except for weighing and mixing the resin PP-1 and the resin PP-7 at a ratio of PP-1/PP-7=65/35 (mass ratio).

Working Example 6

A biaxially stretched polypropylene film was obtained in the same manner as in Working Example 1 except for weighing and mixing the resin PP-1 and the resin PP-8 at a ratio of PP-1/PP-8=65/35 (mass ratio).

Comparative Example 1

A biaxially stretched polypropylene film was obtained in the same manner as in Working Example 1 except for using the resin PP-1 alone.

Comparative Example 2

A cast sheet was produced in the same manner as in Working Example 1 except for using the resin PP-2 alone. Although it was attempted to biaxially stretch this cast sheet in the same manner as in Working Example 1, the cast sheet was broken in the stretching step and a biaxially stretched polypropylene film was not obtained.

Comparative Example 3

A biaxially stretched polypropylene film was obtained in the same manner as in Working Example 1 except for using the resin PP-4 alone.

Comparative Example 4

A biaxially stretched polypropylene film was obtained in the same manner as in Working Example 1 except for using the resin PP-5 alone.

Measurement of Values for Film Characteristics
(1) Film Thickness

The thickness of the film can be measured in accordance with JIS-C2330 using a paper thickness tester, micrometer (JIS-B7502), or the like.

(2) Crystallite Size

The crystallite size of the biaxially stretched polypropylene film was measured as described below using wide angle X-ray diffractometer (XRD).

Measuring instrument: Desktop X-ray diffraction (XRD) instrument, MiniFlex 300, manufactured by Rigaku Corporation X-ray generation output: 30 kV, 10 mA
Irradiated X-ray: Monochromatic CuKα radiation by monochromator (wavelength: 0.15418 nm)
Detector: Scintillation counter
Goniometer scanning: Coupled 2θ/θ scan From the obtained data, a half width of the α-crystal (040) plane reflection peak was calculated by the integrated X-ray powder diffraction software PDXL provided with the instrument using a computer for analysis.

From the obtained half width of the α-crystal (040) plane reflection peak, the crystallite size was determined using the Scherrer equation expressed by Formula (1) below. Note that, in the present invention, the shape factor K was taken to be 0.94.

[Mathematical Formula 2]

$$D = K \times \lambda / (\beta \times \cos \theta) \quad (1)$$

Note that D is the crystallite size (nm), K is a constant (shape factor), λ is the used X-ray wavelength (nm), β is the determined half width, and θ is the Bragg angle.

(3) Dielectric Breakdown Voltage

The dielectric breakdown voltage was measured at 100° C. using a DC power source in accordance with JIS C2330 (2001)7.4.11.2 B (plate electrode method). The dielectric breakdown voltage ($V_{DC}$/μm) was determined by dividing the average dielectric breakdown voltage ($V_{DC}$) of 12 measurements by the thickness (μm) of the film and then calculating the average value of the 8 values after excluding the two highest values and the two lowest values.

Production of Capacitor Element

Aluminum deposition of a special margin deposition pattern was performed on the biaxially stretched polypropylene film obtained in Working Examples 1 to 3 described above at the deposition resistance of 15Ω/□ to obtain a metallized polypropylene film. After the obtained film was slitten to have a smaller width, two of the metallized polypropylene films were combined and wound around 1,100 times using the Automatic Winder model 3KAW-N2, manufactured by Kaido Mfg. Co., Ltd.

After the wound element was subjected to heat treatment at 120° C. while being pressed, the end face of the element was subjected to thermal spraying of zinc metal to obtain a flat capacitor. The completed capacitor had an electrostatic capacitance of 75 μF (±2 μF).

Measurement of Values for Capacitor Element Characteristics (1) Life Test of Capacitor Element (Long-Term Voltage Resistance)

After the capacitor element described above is preheated at 105° C. in advance, initial electrostatic capacitance prior to testing was evaluated at room temperature using the LCR HiTESTER 3522-50, manufactured by Hioki E.E. Corporation. Then, the capacitor element was continuously subjected to a direct-current voltage load of 600 V for 200 hours in a high-temperature chamber at 105° C. The capacitance of the element after 200 hours had elapsed was measured at room temperature using the LCR Tester and the rate of change in capacitance before and after the voltage load is applied was calculated. The rate of change in capacitance after 200 hours had elapsed was evaluated using the average value of three of the elements. The rate of change in capacitance after 200 hours had elapsed was −1.9% for Working Example 1, −1.0% for Working Example 2, and −3.0% for Working Example 3. Note that the rate of change in capacitance after 200 hours had elapsed is preferably −5% or more.

As is clear from Working Examples 1 to 6, the biaxially stretched polypropylene film of the present invention has excellent dielectric breakdown voltage and excellent voltage resistance at high temperatures. Furthermore, although the biaxially stretched polypropylene film of the present invention is an extremely thin biaxially stretched polypropylene film having a thickness of 2.3 µm, it was confirmed that the excellent voltage resistance is exhibited, and thus the biaxially stretched polypropylene film is highly suitable for small and high-capacity capacitors, in which the biaxially stretched polypropylene film is required to have high voltage resistance.

On the other hand, the polypropylene films of Comparative Examples 1 and 3 could not achieve sufficient voltage resistance since the polypropylene films were not composed of polypropylene resins having a predetermined range of difference of the differential distribution values. In particular, the polypropylene films of Comparative Examples 3 and 4 formed from the polypropylene resins that had a small composition of the high molecular weight component and that did not have a predetermined Z average molecular weight resulted in exhibiting significantly low dielectric breakdown voltage. Furthermore, it was not possible to stretch the polypropylene film of Comparative Example 2 into a film.

INDUSTRIAL APPLICABILITY

Since the biaxially stretched polypropylene film for capacitors of the present invention has excellent dielectric breakdown voltage, enhancement of voltage resistance at high temperatures, especially initial voltage resistance and long-term voltage resistance, is expected by producing a capacitor using this film. Furthermore, since the biaxially stretched polypropylene film for capacitors of the present invention can be thin while having excellent dielectric breakdown voltage, the biaxially stretched polypropylene film can be suitably used in a small and high-capacity capacitor that is required to have high voltage resistance.

The invention claimed is:

1. A biaxially stretched polypropylene film for capacitors, wherein a polypropylene resin composing the polypropylene film has
   a number average molecular weight of 40,000 or more and 100,000 or less, and
   a Z average molecular weight of 950,000 or more and 1,500,000 or less,
   and wherein a difference calculated by subtracting a differential distribution value at Log(M)=6.0 from a differential distribution value at Log(M)=4.5 in a molecular weight distribution curve of the polypropylene resin is −15% or more and 4.3% or less.

2. The biaxially stretched polypropylene film for capacitors according to claim 1, wherein the polypropylene resin composing the polypropylene film has a weight average molecular weight of 250,000 or more and 450,000 or less.

3. The biaxially stretched polypropylene film for capacitors according to claim 1, wherein the polypropylene resin composing the polypropylene film has a molecular weight distribution Mw/Mn of 6 or more and 12 or less, which is calculated as the ratio of the weight average molecular weight Mw to the number average molecular weight Mn of the polypropylene resin constituting the polypropylene film.

4. The biaxially stretched polypropylene film for capacitors according to claim 1, wherein the Z average molecular weight of the polypropylene resin composing the polypropylene film is 1,040,000 or more and 1,500,000 or less.

5. The biaxially stretched polypropylene film for capacitors according to claim 1, wherein the polypropylene film is obtained from a polypropylene resin composition by biaxial stretching, and the polypropylene resin composition comprises a polypropylene resin A having a melt flow rate of 4.5 g/10 min or more and a polypropylene resin B2 having a melt flow rate of 4 g/10 min or less, and the polypropylene resin B2 is present in an amount of 1 mass % or more and 70 mass % or less based on 100 mass % of the polypropylene resin A.

6. A metallized polypropylene film for capacitors, wherein metal deposition is carried out on one surface or both surfaces of the biaxially stretched polypropylene film for capacitors according to claim 1.

7. A capacitor produced by the use of the metallized polypropylene film for capacitors according to claim 6.

* * * * *